(12) United States Patent
Khonsari et al.

(10) Patent No.: US 6,942,219 B2
(45) Date of Patent: Sep. 13, 2005

(54) MECHANICAL SEAL HAVING A DOUBLE-TIER MATING RING

(75) Inventors: Michael M. Khonsari, Baton Rouge, LA (US); Anoop K. Somanchi, Baton Rouge, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 65 days.

(21) Appl. No.: 10/689,406

(22) Filed: Oct. 20, 2003

(65) Prior Publication Data

US 2005/0082765 A1 Apr. 21, 2005

(51) Int. Cl.[7] .................... F16J 15/34; F28D 11/00; F28F 7/00
(52) U.S. Cl. .................... 277/360; 277/401; 277/408; 165/86; 165/185
(58) Field of Search .................... 277/358, 359–360, 277/401, 408; 165/86, 185, 907

(56) References Cited

U.S. PATENT DOCUMENTS

| | | | |
|---|---|---|---|
| 4,005,747 A | 2/1977 | Ball | 165/134 |
| 4,123,069 A | 10/1978 | Sato | 277/70 |
| 4,365,815 A * | 12/1982 | Scott | 277/387 |
| 4,471,964 A * | 9/1984 | Kotzur | 277/347 |
| 4,613,141 A * | 9/1986 | Heinen | 277/359 |
| 5,238,253 A * | 8/1993 | Sieghartner | 277/408 |
| 6,149,160 A | 11/2000 | Stephens et al. | 277/399 |
| 6,280,090 B1 | 8/2001 | Stephens et al. | 384/284 |
| 2004/0026871 A1 | 2/2004 | Stephens et al. | 277/401 |

FOREIGN PATENT DOCUMENTS

| | | | |
|---|---|---|---|
| EP | 290752 A2 * | 11/1988 | F16J 15/34 |
| JP | 58146770 | 9/1983 | |
| JP | 59194171 | 11/1984 | |
| JP | 600378462 | 2/1985 | |
| JP | 2003074713 | 3/2003 | |

* cited by examiner

*Primary Examiner*—Alison Pickard
*Assistant Examiner*—Vishal Patel
(74) *Attorney, Agent, or Firm*—André J. Porter; John H. Runnels; Bonnie J. Davis

(57) ABSTRACT

An apparatus and method to enhance the overall performance of mechanical seals in one of the following ways: by reducing seal face wear, by reducing the contact surface temperature, or by increasing the life span of mechanical seals. The apparatus is a mechanical seal (e.g., single mechanical seals, double mechanical seals, tandem mechanical seals, bellows, pusher mechanical seals, and all types of rotating and reciprocating machines) comprising a rotating ring and a double-tier mating ring. In a preferred embodiment, the double-tier mating ring comprises a first and a second stationary ring that together form an agitation-inducing, guided flow channel to allow for the removal of heat generated at the seal face of the mating ring by channeling a coolant entering the mating ring to a position adjacent to and in close proximity with the interior surface area of the seal face of the mating ring.

9 Claims, 6 Drawing Sheets

MECHANICAL SEAL HAVING A DOUBLE-TIER MATING RING

The development of this invention was partially funded by the Government under grant number DE-FG48-02R810707, from the U.S. Department of Energy. The Government has certain rights in this invention.

This invention pertains to an apparatus that enhances the overall performance of mechanical seals (e.g., single mechanical seals, double mechanical seals, tandem mechanical seals, bellows, pusher mechanical seals, and all types of rotating and reciprocating machines) in one or more of the following ways: by reducing the contact surface temperature, reducing contact surface wear, or by increasing the life span of mechanical seals.

A mechanical seal is a device that prevents leakage of a lubricant or a process fluid contained in a mechanical system. Mechanical seals typically comprise a rotating (primary) ring and a mating ring having contact surfaces that slide against each other to form a seal between a rotating shaft and a mechanical housing structure. In most applications, the rotating ring is affixed to a rotary shaft, while the mating ring is installed in a gland (i.e., a device which holds the stationary ring in a cavity within the mechanical housing structure and connects it to a chamber surrounding the seal) that is adapted to abut the rotating ring. The rotating ring is typically pressed against the stationary ring either by a spring or a bellows system; typically, an elastomer or a metallic component is used as a dynamic sealing element to minimize leakage between the rotating ring and the stationary ring by exerting a constant force against the rotating ring so that it stays in contact with the mating ring.

A common cause for failure of a mechanical seal is excessive wear, which often occurs when the mechanical seal becomes unbalanced. If the seal is unbalanced, spring pressure and fluid pressure cause an increase in contact pressure between the contact surfaces of the rotating and mating rings, resulting in excessive wear and heat generation. Excessive heat and associated problems such as temperature and pressure gradients at the contact surface may lead to thermoelastic instability, causing hot spots on the contact surface of the mating ring, seal blistering, heat checking, and seal face cracking. These problems often result in excessive leakage and premature seal failure.

Japanese Abstract Publication No. 2003074713 describes a device for reducing the sliding heat of a mechanical seal comprising a seal ring and a seal face by passing a fluid between a shaft and the seal ring to the inner peripheral side of the seal face.

U.S. Pat. No. 6,149,160 describes a device and method for improving heat transfer capability and lubricant flow of mechanical bearings and seals (e.g., ball bearings, roller bearings, journal bearings, air bearings, magnetic bearings, single mechanical seals, double mechanical seals, tandem mechanical seals, pusher mechanical seals, and bellows). The load-bearing surfaces of the bearings and seals are covered with large fields of high aspect ratio microstructures, such as microchannels or microposts.

U.S. Pat. No. 4,365,815 describes a device and method for cooling the working face of mechanical working elements such as bearings, rotary seals, and friction devices comprising two sealing members, each having a sealing face, mounted on a rotatable shaft, wherein at least one of the sealing members has a cavity with interconnecting pores that receive a cooling fluid to remove heat generated between the sealing faces.

Japanese Abstract Publication No. 60037462 describes a device and method to improve the cooling efficiency of a mechanical seal comprising an inner and outer fixed ring by passing cooling water through a passage between the fixed rings.

Japanese Abstract Publication No. 59194171 describes a device and method to remove sliding heat generated in a mechanical seal comprising a casing and two sealing members by injecting a sealing liquid onto one the sealing members.

Japanese Abstract Publication No. 58146770 describes a device and method to remove frictional heat generated in a mechanical seal comprising a first and a second sealing ring, each having a sealing face, a casing, and a heat pipe having a first end arranged near the vicinity of the first sealing ring, and a second end exposed in a chamber, by allowing frictional heat generated at the sealing end faces to be transmitted by the heat pipe from the first sealing ring to the chamber.

U.S. Pat. No. 4,123,069 describes a device for mechanically sealing a rotary shaft extending through stationary casings, comprising a rotatable ring (mating ring) fixed to the rotary shaft, a first stationary ring surrounding the rotary shaft and affixed to one of the casings, and a second stationary ring surrounding the rotary shaft and adapted to engage the rotatable ring. The rotatable ring comprises a plurality of radial passages for receiving a cooling medium to remove frictional heat generated between the rotatable ring and the second stationary ring.

U.S. Pat. No. 4,005,747 describes a heat exchanger and method for cooling a mechanical seal assembly affixed around a pump shaft. The heat exchanger comprises at least two cylindrical housing members having a plurality of grooves and slots surrounding the shaft to permit the flow of hot fluid from the pump to the heat exchanger, and cool fluid from the heat exchanger to flow back through the grooves and slots.

An unfilled need exists for an apparatus to enhance the overall performance of mechanical seals (e.g., single mechanical seals, double mechanical seals, tandem mechanical seals, bellows, pusher mechanical seals, and all types of rotating and reciprocating machines) in one or more of the following ways: by reducing the contact surface temperature, reducing contact surface wear, or by increasing the life span of mechanical seals.

We have discovered an apparatus to enhance the overall performance of mechanical seals that are used to prevent leakage of a lubricant or a process fluid between a rotating shaft and a mechanical housing structure, in one or more of the following ways: by reducing the contact surface temperature, reducing contact surface wear, or by increasing the life span of mechanical seals. Compared to prior apparatus and methods, the novel apparatus and method improves heat transfer by inducing agitated coolant flow patterns and controllably channeling coolant flow inside the mating ring such that coolant uniformly contacts a substantial portion of the interior surface area of the seal face. The apparatus is a mechanical seal (e.g., single mechanical seals, double mechanical seals, tandem mechanical seals, bellows, pusher mechanical seals, and all types of rotating and reciprocating machines) comprising a rotating ring and a double-tier mating ring.

In a preferred embodiment, the double-tier mating ring allows for the axial and circumferential removal of heat generated at the seal face, the surface of the mating ring that slides against the rotating ring, by uniformly channeling a coolant (e.g., air, nitrogen, water, ethylene glycol, propane, lube oil, etc.) entering the mating ring to a position adjacent to and in close proximity with the interior surface area of the mating ring to substantially reduce the highest surface temperatures that occur on the seal face. This is achieved by fabricating the double-tier mating ring from two half rings, a first and a second stationary ring, that together form an agitation-inducing, guided flow channel. The first stationary ring has a groove-channel and symmetrically-spaced radial holes or slots that extend from the outer diameter to the inner diameter of the first stationary ring to form coolant inlets and outlets. The second stationary ring has a circumferential diverter adapted to be inserted into the groove-channel of the first stationary ring to form a circumferential channel that diverts coolant towards the interior surface area of the seal face. The diverted coolant impinges upon the interior surface of the mating ring removing undesirable heat from the seal face where the contact occurs, as it flows towards the exit ports.

The general purpose of this invention is to provide a reliable, inexpensive apparatus that enhances the overall performance of mechanical seals (e.g., single mechanical seals, double mechanical seals, tandem mechanical seals, bellows, pusher mechanical seals, and all types of rotating and reciprocating machines). The basic design of the apparatus is that of a conventional mechanical seal comprising a rotating ring and a mating ring. In a preferred embodiment, the mating ring is formed from two half rings, a first stationary ring having a circumferential groove-channel and a seal face that abuts the rotating ring, and a second stationary ring having a circumferential diverter adapted to fit within the groove-channel of the first stationary ring and to form a divergent flow channel that induces an agitated flow pattern in the mating ring as it diverts coolant towards the interior surface area of the seal face.

The mechanical components should be capable of withstanding heat produced while the mechanical seal is operating, and should have a relatively high mechanical strength and a relatively high resistance to corrosion, friction, and wear, such as stainless steel, Ni-resist, stellite, steel, titanium, ceramics, and graphite composites. Optionally, a thin protective coating capable of improving the mechanical and tribological properties (e.g., hardness, coefficient of friction, and rate of wear) of mechanical components may be conformally deposited onto the mechanical seal such as a Ti-containing hydrocarbon (Ti—C:H)). See, e.g., U.S. patent application Ser. No. 10/660,926.

There are several advantages to the novel, double-tier mating ring to form a seal between a rotating shaft and a mechanical housing structure. The number of components is small. Fabrication is simple and inexpensive. The double-tier mating ring may be dismantled and cleaned if the coolant channel or inlet and outlet ports become clogged with debris. The stationary rings may be made from different materials having different heat conducting characteristics. If the first stationary ring abutting the rotating ring becomes worn, it can be replaced without having to replace the second stationary ring. The design of the novel, double-tier mating ring increases the service life and continuous operating times of a mechanical seal. By diverting the flow of coolant to the interior surface area of the seal face, heat is substantially removed from the contact surface. Thus, the occurrence of hot spots, blistering, heat checking, seal face cracking, and excessive wear, which can ultimately cause premature seal failure, is minimized.

EXAMPLE 1

Figure 1:
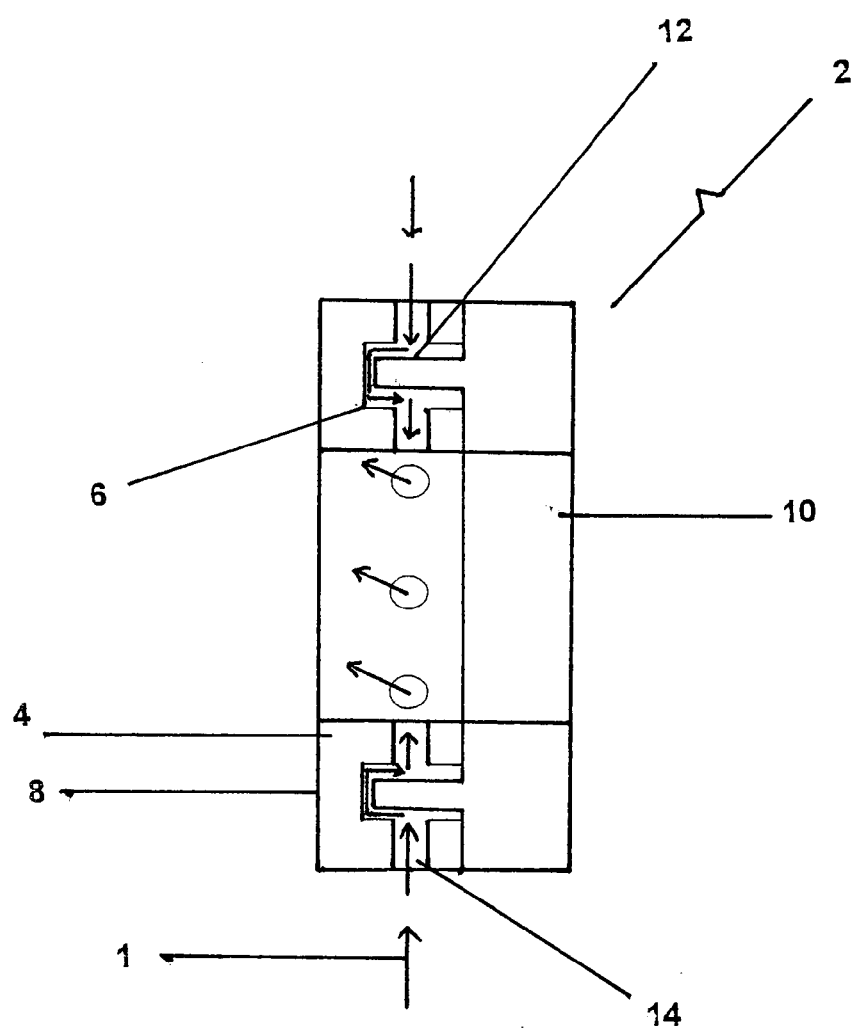
FIG. 1 is a schematic diagram of one embodiment of the mating ring.

FIG. 1 is a schematic diagram of one embodiment of the mating ring a double-tier mating ring 2 in accordance with this invention. This embodiment comprises a first stationary ring 4 having a circumferential groove-channel 6 and a seal face 8, and a second stationary ring 10 having a circumferential diverter 12 for diverting the flow of coolant entering the first stationary ring 4. See FIGS. 2A and 2B. Circumferential groove-channel 6 was sized and shaped to receive circumferential diverter 12, so that, when combined together, first and second stationary rings (4 and 10) formed a mating ring 2 having a divergent flow-channel 14. See FIGS. 2A, 2B, and 3. Divergent flow-channel 14 was adapted to direct coolant 1 entering first stationary ring 4 to a position adjacent to and in close proximity with the interior surface area of the seal face 8 before exiting first stationary ring 4. In this embodiment, first and second stationary rings (4 and 10) were adapted so that they could be combined together using a shrink-fitting technique. Alternatively, first and second stationary rings (4 and 10) can be adapted to allow them to be threaded or bolted together.

Figure 2A:
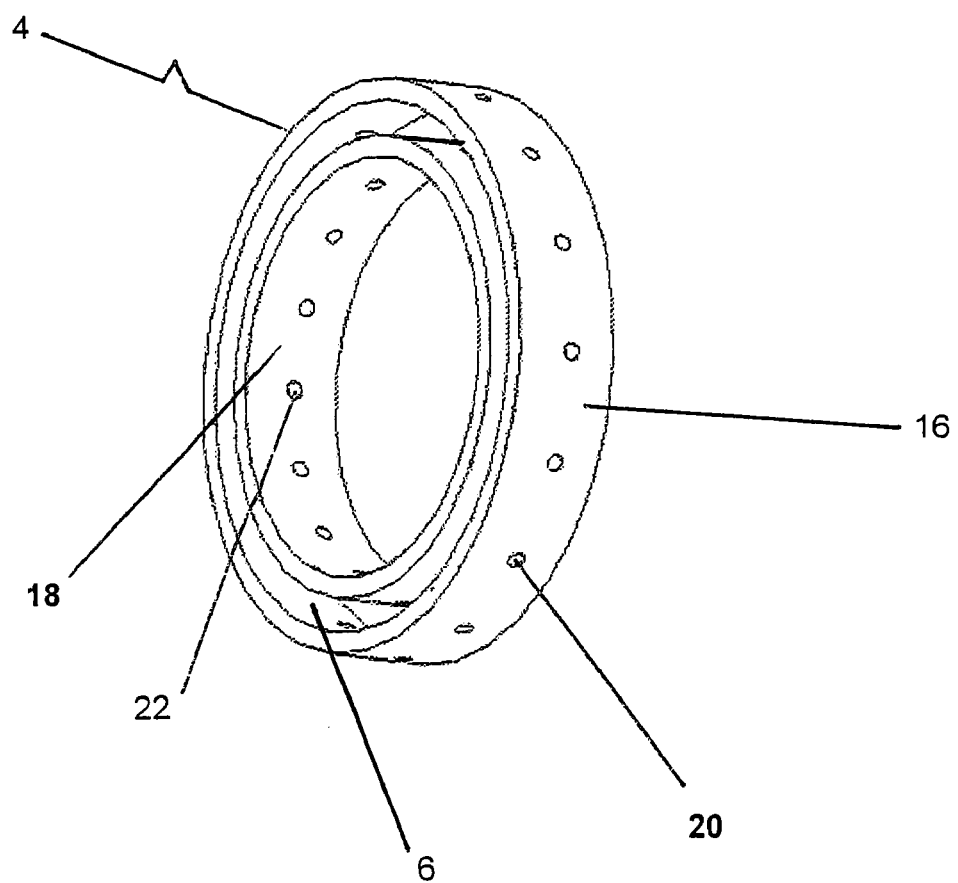
FIG. 2A is a perspective view of one embodiment of the first stationary ring.
Figure 2B:
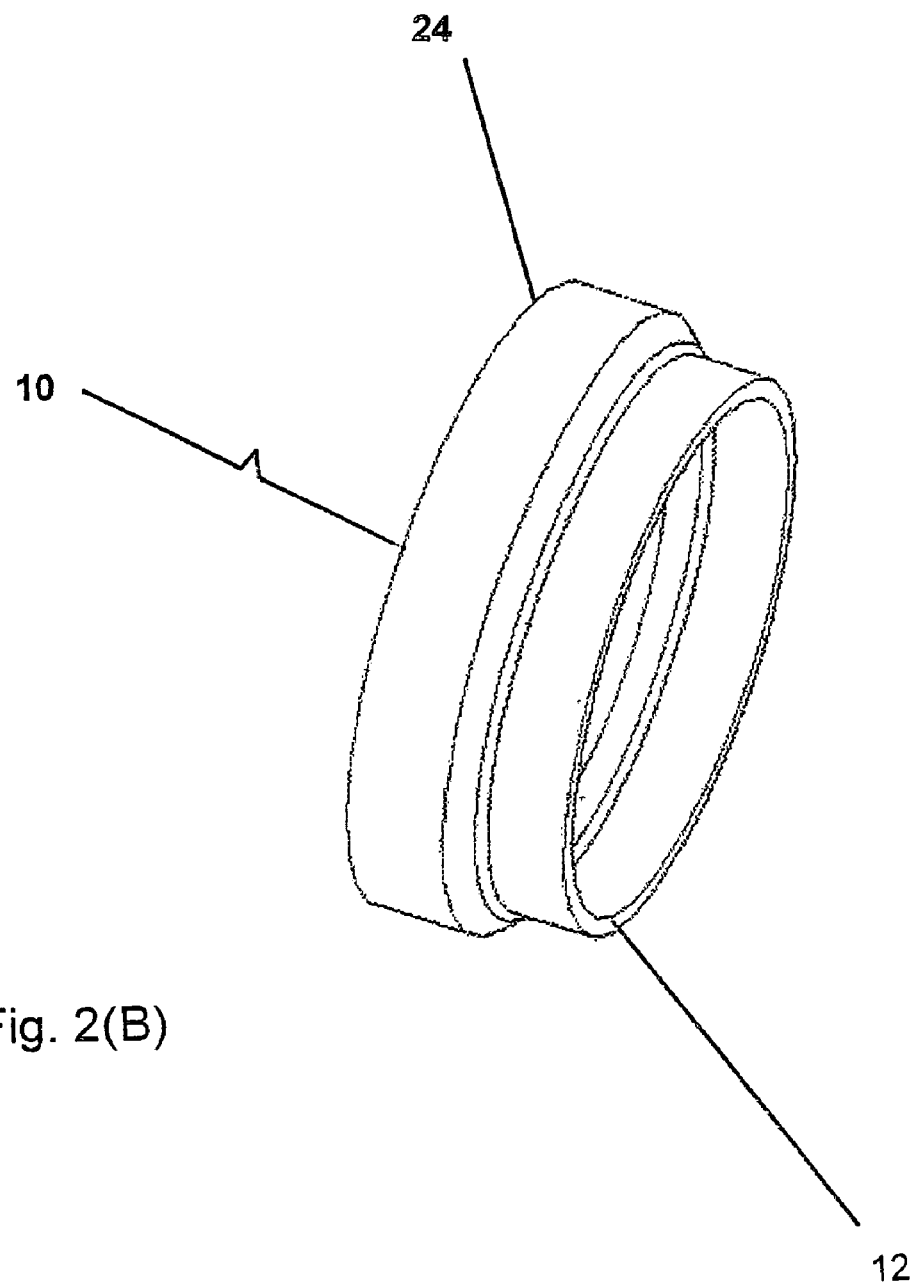
FIG. 2B is a perspective view of one embodiment of the second stationary ring.
Figure 3:
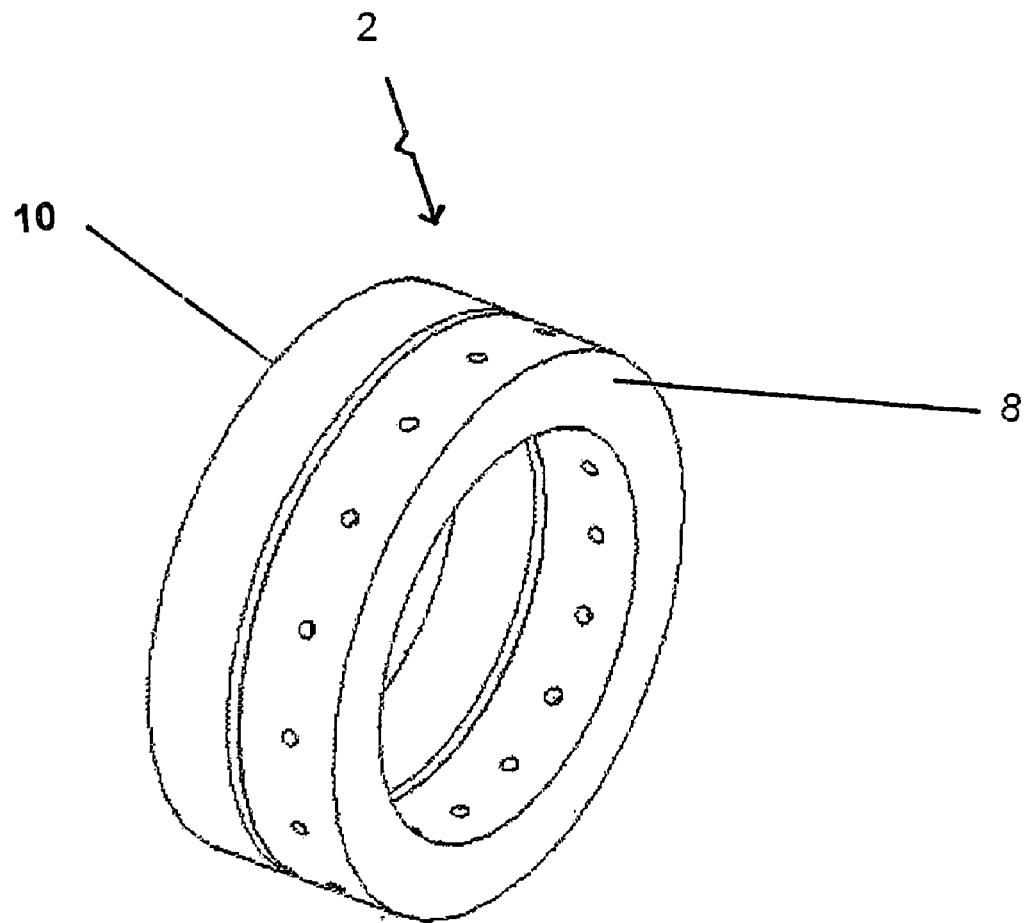
FIG. 3 is a perspective view of one embodiment of the mating ring.

FIGS. 2A and 2B illustrate perspective views of the component parts of one embodiment of a double-tier mating ring 2, in accordance with this invention. FIG. 2A is a perspective view of one embodiment of first stationary ring 4. In this embodiment, first stationary ring 4 is circular and comprises an outer surface 16 and an inner surface 18, each having a plurality of radial holes adapted to form inlet and outlet ports (20 and 22, respectively). The radial holes were adapted to allow coolant to enter circumferential groove-channel 6 through inlet ports 20 and uniformly remove heat from the interior surface area of seal face 8 before exiting through outlet ports 22, while minimizing any effects of back pressure. In a preferred embodiment, sixteen holes were symmetrically distributed along the outer and inner surfaces (16 and 18) to allow coolant to flow through first stationary ring 4, and to maintain sufficient heat transfer such that any thermoelastic instability was minimized. In an alternative embodiment, a plurality of holes (e.g., eight, thirty-two, etc.) may be used to allow coolant to flow through first stationary ring 4. See seal face 8 in FIG. 3. The diameter of the holes may also be increased or elliptically-shaped to allow an increased influx of the coolant entering the mating ring.

FIG. 2B is a perspective view of one embodiment of the second stationary ring. In this embodiment, second stationary ring 10 is circular and comprises a flat end surface 24 adapted to fit in a gland or a housing structure (not shown). See gland 28 in FIG. 4. In a preferred embodiment, circumferential diverter 12 had rough surfaces capable of agitating the coolant flow internally, causing substantial fluid mixing to increase the level of heat transfer between the interior surface area of seal face 8 and the coolant. Optionally, grooves (not shown) may be added to the surfaces of circumferential diverter 12 to further increase flow agitation and mixing for enhancement of heat transfer.

EXAMPLE 2

Figure 4:
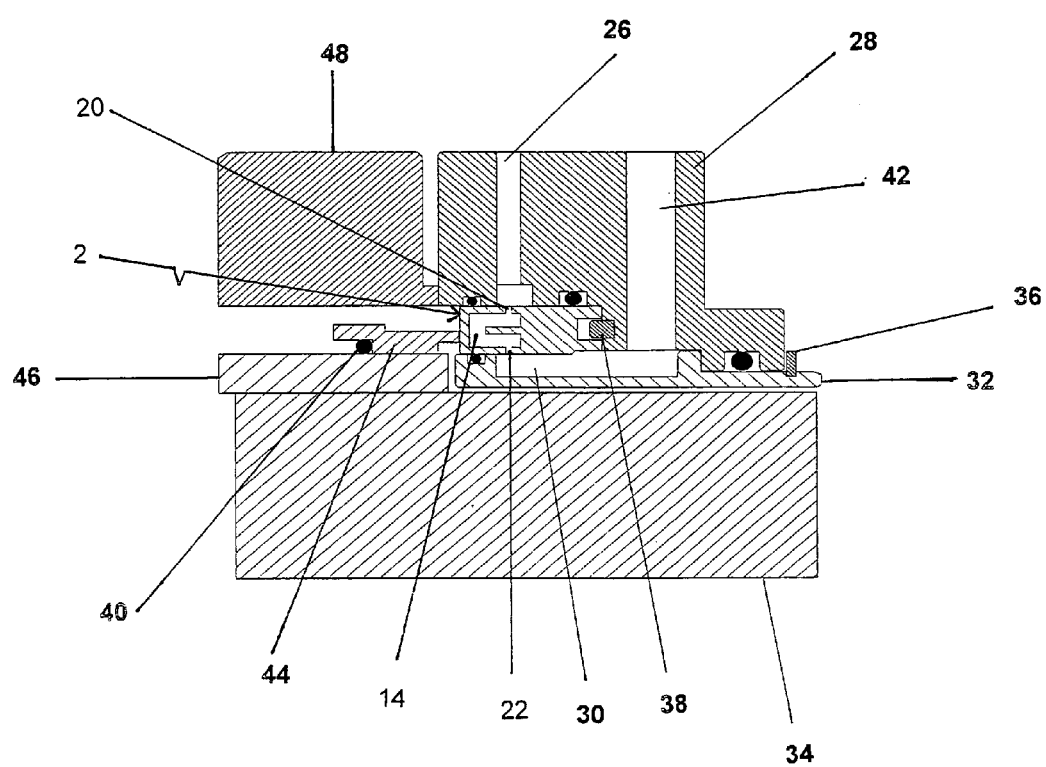
FIG. 4 is a cross-sectional, schematic diagram of some of the parts of a pump operating with one embodiment of the mechanical seal.

FIG. 4 is a sectional view of one embodiment of a mechanical seal used in a water pump (e.g., model # 3196ST, 1×1.5–6; ITT-Goulds Pumps, Albany, N.Y.). In this embodiment, mating ring 2 was constructed such that coolant entered through inlet ports 20 and flowed through divergent flow-channel 14 before exiting mating ring 2 through outlet ports 22. Coolant was supplied to inlet ports 20 through a supply channel 26 located in seal gland 28. As the coolant exited outlet ports 22, it flowed away from mating ring 2 through a routing port 30 located between sleeve 32 and mating ring 2. Sleeve 32 was held in close proximity with rotary shaft 34 using a snap ring 36. Mating ring 2 was securely affixed to seal gland 28 using an anti-rotation pin 38 which was adapted to prevent mating ring 2 from rotating. A plurality of rubber O-rings 40 were adapted for use as secondary sealing components to help prevent fluid from escaping seal gland 28. Rotating ring 44, located in a stuffing box 48, was adapted to form a seal with mating ring 2 using a hook sleeve 46 which allowed rotating ring 44 to rotate with shaft 34. Exiting coolant was removed from mating ring 2 through exit channel 42 in seal gland 28. In one embodiment, when liquid (e.g., water) is used as the coolant, the flow loop is closed, allowing the coolant to exit channel 42 and return to supply channel 26 for recirculation in a continuous loop. Alternatively, when gas is used as the coolant, the flow loop may be left as an open loop, allowing the coolant to exit channel 42 and escape to the atmosphere.

EXAMPLE 3

Construction of Prototype

A prototype double-tier mating ring 2 was made of stainless steel. First and second stationary rings (4 and 10) had an outside diameter of 2.165 in and an inside diameter of 1.587 in. Circumferential groove-channel 6 was 0.4 in wide and 0.078 in thick. The wall thickness dividing groove-channel 6 and seal face 8 was 1/32 in. Circumferential diverter 12 was 0.338 in long and 0.0665 in thick, which provided a 1/32 in thick agitation-inducing, divergent path for coolant flow once mating ring 2 was assembled. Sixteen 1/16 in dia radial holes were drilled through first stationary ring 4 at a distance of 0.218 in from the edge of seal face 8 to form inlet and outlet ports (20 and 22) in the outer and inner surfaces (16 and 18) of first stationary ring 4, respectively. First and second stationary rings (4 and 10) were then shrink-fitted together to form a single mating ring 2 having an outer diameter of 2.165 in, an inner diameter of 1.587 in, and a thickness of 0.738 in. Mating ring 2 was then coated with a titanium-containing hydrocarbon (Ti:C—H).

A conventional rotating ring 44 having an outer diameter of 1.762 in and an inner diameter of 1.593 in was used to form a seal with mating ring 2. Rotating ring 44 was made from carbon.

EXAMPLE 4

Uniform Heat Transfer Tests

Figure 5:
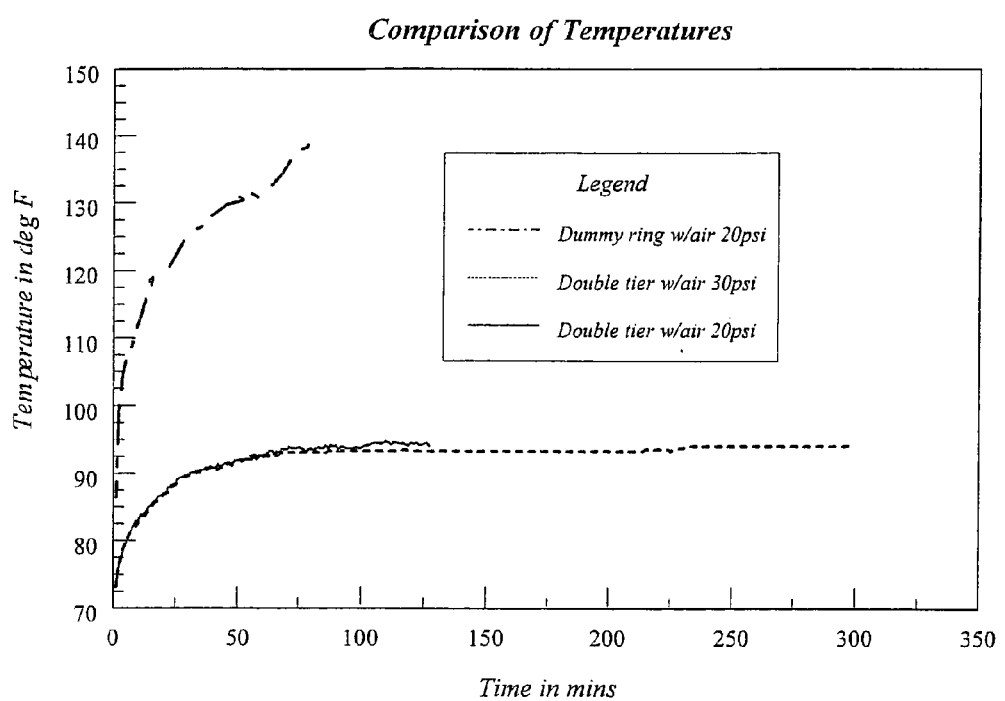
FIG. 5 is a graph plotting temperature measurements for two mechanical seals as a function of time.

To confirm that the prototype mechanical seal was highly effective in uniformly removing heat generated at the contact surface between the mating ring and rotating ring, tests were conducted using a conventional mechanical seal having a solid mating ring (not shown) without holes drilled through to allow coolant to flow through the mating ring and the prototype of Example 3, measuring temperature at the seal face of each mating ring as a function of time, as shown in FIG. 5. (Both mechanical seals were coated with a layer of Ti:C—H.) To measure the contact surface temperature, thermocouples (J-type; GulfSensors, Inc., Baton Rouge, La.) were placed in two 0.7375 in deep holes drilled into each mating ring at a 45° angle with the anti-rotation pin 38. (The holes were ~0.002 in from the contact surface of the mating rings.) A 16-channel thermocouple monitor (Model SR630; Stanford Research Systems, Sunnyvale, Calif.) was used to record the data from the thermocouples. To assess performance, the mechanical seals were then consecutively installed in a GOULDS® water pump (model # 3196ST, 1×1.5–6; ITT-Goulds Pumps, Albany, N.Y.). FIG. 5 compares temperature measurements for the two mechanical seals as a function of time. Air was pumped into the inlets of each mechanical seal at a temperature and pressure of 80° F. and 20 psi, respectively.

The conventional mechanical seal was operated for 55 min. During which time, the temperature at the contact surface of the mating ring increased to 150° F., and failed to reach steady state. As a result, the test was suspended because of the increasingly high probability of seal failure caused by the rising temperatures generated at the seal face. Exit temperature was not measured.

The second test involved measuring the temperature produced at the contact surface of the prototype described in Example 3. The contact surface temperature gradually increased until a steady state was reached at 95° F. after operating for approximately 60 min and was tested for an additional 60 min. The temperature exiting the mating ring 2 was 87° F.

Another test was conducted using the prototype mechanical seal. The air pressure supplied to inlet ports 20 was increased to 30 psi. As a result, the contact surface temperature gradually increased until a steady state was reached at 95° F. after operating for approximately 60 min and was tested for an additional 240 min.

From the above tests, several conclusions were reached. The double-tier mating ring 2 was effective in reducing heat generated in the mechanical seal. The circumferential diverter 12 was effective in creating a divergent flow-channel 14. The divergent flow-channel 14 produced three beneficial outcomes. First, the coolant flow entering the mating ring 2 and circumferential diverter 12 caused agitation and mixing, which allowed coolant to be thrown to the periphery of the divergent flow-channel 14. Second, the coolant was channeled to a position in close proximity with the interior surface area of the seal face 8 of the mating ring 2 and the presence of the coolant in the inner diameter of the mating ring 2 was effective in substantially removing heat from the seal face 8. Third, examination of the seal face 8 showed no evidence of surface distress.

The complete disclosures of all references cited in this specification are hereby incorporated by reference. In the event of an otherwise irreconcilable conflict, however, the present specification shall control.

We claim:

1. A mechanical seal comprising a rotating ring and a mating ring adapted to seal to one another, wherein:
   (a) said mating ring comprises a first stationary ring comprising a circumferential groove-channel, a seal face, and an outer and inner surface each having a plurality of symmetrically-spaced radial holes adapted respectively to form inlet and outlet ports, and a second stationary ring comprising a circumferential diverter;

(b) said circumferential groove-channel is adapted to receive said circumferential diverter so that, when combined, said first and said second stationary rings form said mating ring having a circumferential, divergent flow-channel communicating with said inlet and said outlet ports; and (c) if a coolant is supplied to said divergent flow-channel through said inlet ports, said divergent flow-channel causes the coolant to flow to substantially all portions of the interior surface area of said seal face before exiting through said outlet ports;

whereby heat transfer at the interface of said rotating ring and said mating ring is substantially greater than what would be the heat transfer between otherwise identical sealing members lacking said divergent flow-channel.

2. A mechanical seal as recited in claim 1, wherein said first and said second stationary rings are adapted to be shrink-fitted together.

3. A mechanical seal as recited in claim 1, wherein said first stationary ring and said second stationary rings are adapted to be threaded together.

4. A mechanical seal as recited in claim 1, additionally comprising a coolant selected from the group consisting of air, nitrogen, water, ethylene glycol, propane, and lubricating oil.

5. A mechanical seal as recited in claim 1, wherein said mating ring is adapted to use air as a coolant.

6. A mechanical seal as recited in claim 1, wherein said mating ring is coated with a Ti-containing amorphous hydrocarbon.

7. A mechanical seal as recited in claim 1, wherein said first stationary ring has at least sixteen inlet and sixteen outlet ports.

8. A mechanical seal as recited in claim 1, wherein said circumferential, divergent flow-channel is adapted to induce an agitated coolant flow pattern.

9. A mechanical seal as recited in claim 1, wherein said circumferential, divergent flow-channel is adapted to induce a turbulent coolant flow pattern.

* * * * *